United States Patent [19]
Richter et al.

[11] 3,776,386
[45] Dec. 4, 1973

[54] APPARATUS FOR ROTARY FILTERS

[75] Inventors: Paul O. Richter, Salt Lake City; Robert M. Janchus, Bountiful; Shih C. Shen, Salt Lake City, all of Utah

[73] Assignee: Envirotech Corporation, Salt Lake City, Utah

[22] Filed: Aug. 16, 1971

[21] Appl. No.: 171,890

[52] U.S. Cl. ............................................. 210/398
[51] Int. Cl. .......................................... B01d 33/00
[58] Field of Search ..................... 210/392, 395, 398, 210/399, 402, 404; 285/107, 299, 226

[56] References Cited
UNITED STATES PATENTS

| | | | |
|---|---|---|---|
| 2,655,265 | 10/1953 | Little | 210/398 |
| 2,118,681 | 5/1938 | Macdonald | 285/226 X |
| 2,496,471 | 2/1950 | Hornbostel | 285/299 X |
| 3,369,829 | 2/1968 | Hopkins | 285/299 X |
| 3,490,792 | 1/1970 | Piegza | 285/299 X |
| 3,409,139 | 11/1968 | Jackson et al. | 210/404 |
| 2,489,681 | 11/1949 | Smith et al. | 251/87 |
| 3,027,011 | 3/1962 | Flynn | 210/404 |

*Primary Examiner*—Frank A. Spear, Jr.
*Assistant Examiner*—T. A. Granger
*Attorney*—Robert R. Finch et al.

[57] ABSTRACT

At the valve end of a rotary drum filter adapted for high submergence operation, an elongated trunnion extends to a trunnion bearing spaced outwardly of the tank wall; a longitudinally-splitable valve, non-integral with the bearing, is mounted outside the filter tank concentrically about and axially slidable on the trunnion between the bearing and tank. A short conduit conducts filtrate from the drum to the valve for discharge, and a flexible coupling surrounds the junction between the conduit and the valve and connects the valve to the filter tank.

6 Claims, 5 Drawing Figures

3,776,386

INVENTORS
PAUL O. RICHTER
ROBERT M. JANCHUS
SHIH C. SHEN
BY Robert Krebs
Their Attorney

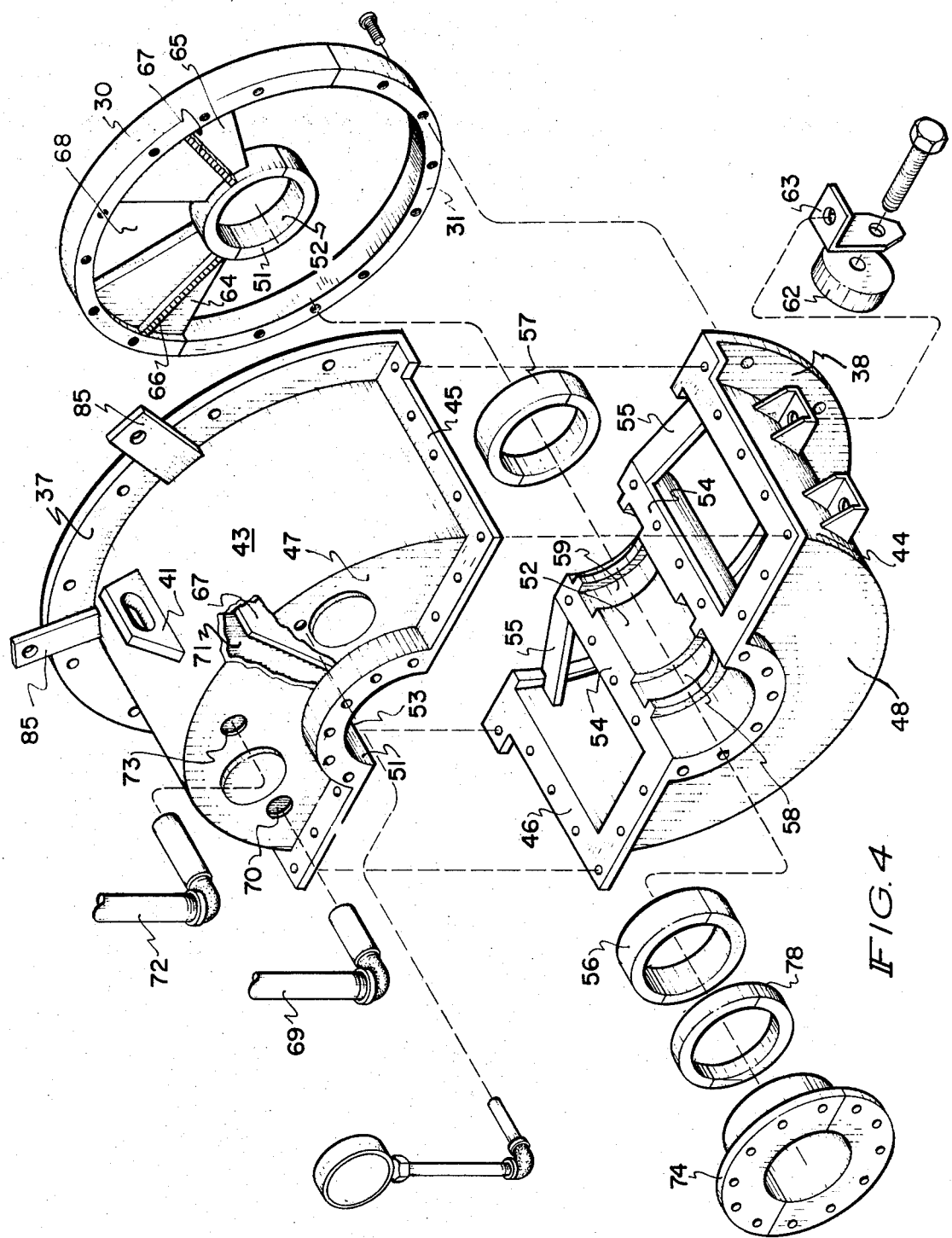

APPARATUS FOR ROTARY FILTERS

BACKGROUND OF THE INVENTION

Rotary filters are widely utilized in industry to mechanically remove suspended particulates from liquids. Typical of these is the rotary-drum filter which comprises a rotatably-mounted, horizontally-disposed filtering drum arranged so that successive portions move into and out of submergence in a tank which contains a liquid bath. Liquid passes through filter medium lying on the drum's surface; solids deposit on the medium and the filtrate is carried, via suitable conduits, to one end of the drum for discharge. A pressure differential may be created at the drum surface to urge liquid from the bath through the filter medium. Typically, the differential pressure is a vacuum which is communicated to the drum periphery via the same pipes which discharge the filtrate.

The function of a valve on the filter is to connect selected portions of the drum surface to vacuum and to conduct filtrate to discharge. Typically, the valve incorporates devices to cut off vacuum to the drum's surface at the cake-discharging locations while applying vacuum at the submerged locations where the cake is formed. In the usual prior construction, a valve is secured to the tank and the drum's trunnion passes through the valve and is journalled in a close-coupled bearing on the tank's wall. Such structures also require a stuffing box to prevent leakage from the tank around the trunnion. As is known, stuffing boxes are always subject to leaks and are particularly troublesome in high submergence operation where the trunnion is completely submerged.

SUMMARY OF THE INVENTION

A rotary-drum filter is provided with an extended trunnion at the discharge end and the trunnion is in turn journalled in a supporting bearing spaced outwardly from the end wall of the tank. A filtrate valve, separate from the bearing, is mounted concentrically about the trunnion between the bearing and the tank wall. The valve connects to the filtering drum for receiving filtrate therefrom. The valve is preferably carried by a separate support and is also arranged to slide axially on the trunnion when desired. Means are provided to maintain a definite spacing between the valve and the outlet ports of the drum to eliminate wear therebetween. A coupling, such as flexible bellows, extends between the tank and the valve and surrounds the connection between the drum and valve to contain any leakage. This valve with the associated trunnion and bearing arrangement is especially adapted for high submergence operation as commonly encountered in pulp washing.

The valve may be formed from at least two separable and complemental parts which mate together to encircle the trunnion and, when separated, enable convenient removal of the valve from the trunnion for valve maintenance or repair without disturbing the trunnion and bearings or any other part of the filter. A single seal about the shaft is usually provided at the outboard end of the valve.

An object of the present invention is to provide an improved arrangement, including a valve, for rotary filters of the disc or drum type.

Another object is to provide a simplified, readily removable, non-supporting valve for rotary filters.

Yet another object is to provide a valve for such filters which eliminates the usual stuffing box, large-diameter bearing, and external spring-loading on bearing-integral filtrate-discharge valves.

A further object is to provide a construction in which the rotary filtering member is supported on a trunnion that is, in turn, journalled in a bearing spaced from the filtering member with a filtrate valve between the bearing and filtering member so that either the bearing or valve is accessible independently of the other.

BRIEF DESCRIPTION OF THE DRAWINGS

The aforementioned and further objects and advantages may be readily ascertained by referring to the following description and appended illustrations, in which:

FIG. 4 is an exploded perspective view of the valve employed on the filter illustrated in FIG. 1.

DETAILED DESCRIPTION

Figure 1:
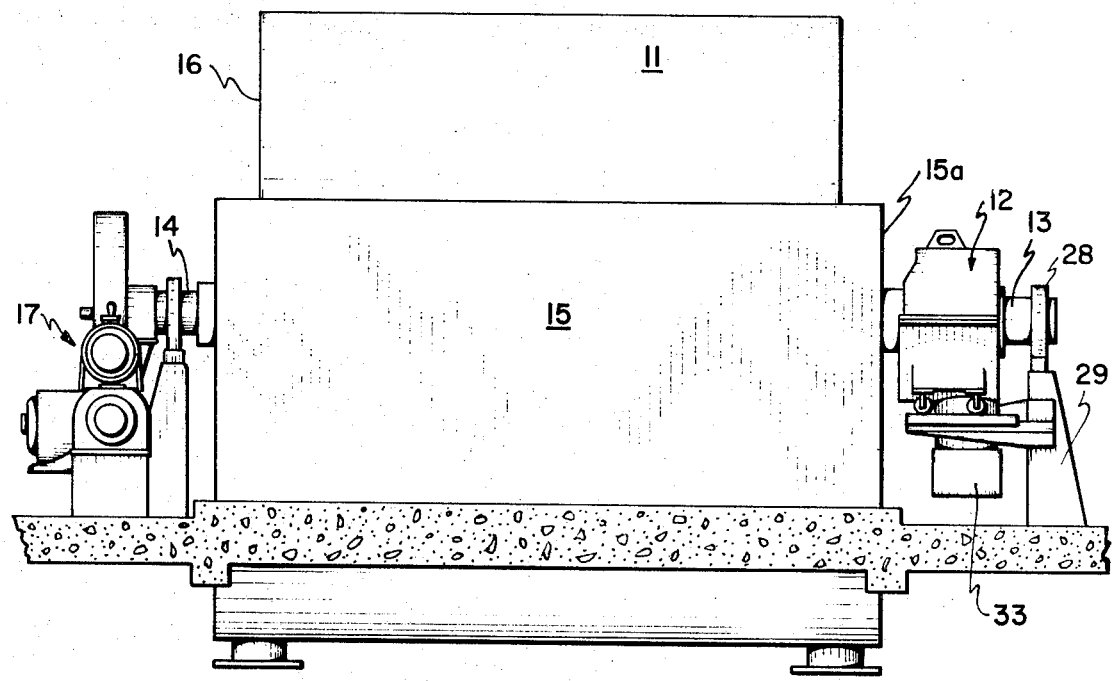
FIG. 1 is a side elevation of a rotary drum filter constructed according to the invention.

FIG. 1 illustrates a rotary-drum vacuum filter comprising a cylindrical close-ended drum 11 covered by a filter medium and rotatably supported by trunnions 13 and 14 fixed to opposite ends of the drum and extending through opposite end walls of a tank 15 which is provided to hold a bath of liquid-suspended particulates. Trunnion 14 extends coaxially at the drum's end 16 and engages a suitable drive 17 which rotates the drum. The other trunnion 13 is fixed to the other end of the drum for rotation therewith and extends therefrom through the tank's end wall 15a and is journalled in outboard bearing 28 resting on separate support 29, spaced a significant distance from the tank. A valve 12, explained later herein in detail, encircles the trunnion 13 but is spaced from the bearing 28. Filtrate flows into the valve and is discharged therefrom through a depending barometric pipe 33. In this arrangement, an effective differential in pressure may be produced at the drum's surface solely by the siphon effect of filtrate flowing through the barometric pipe or by external pump means.

Figure 3:
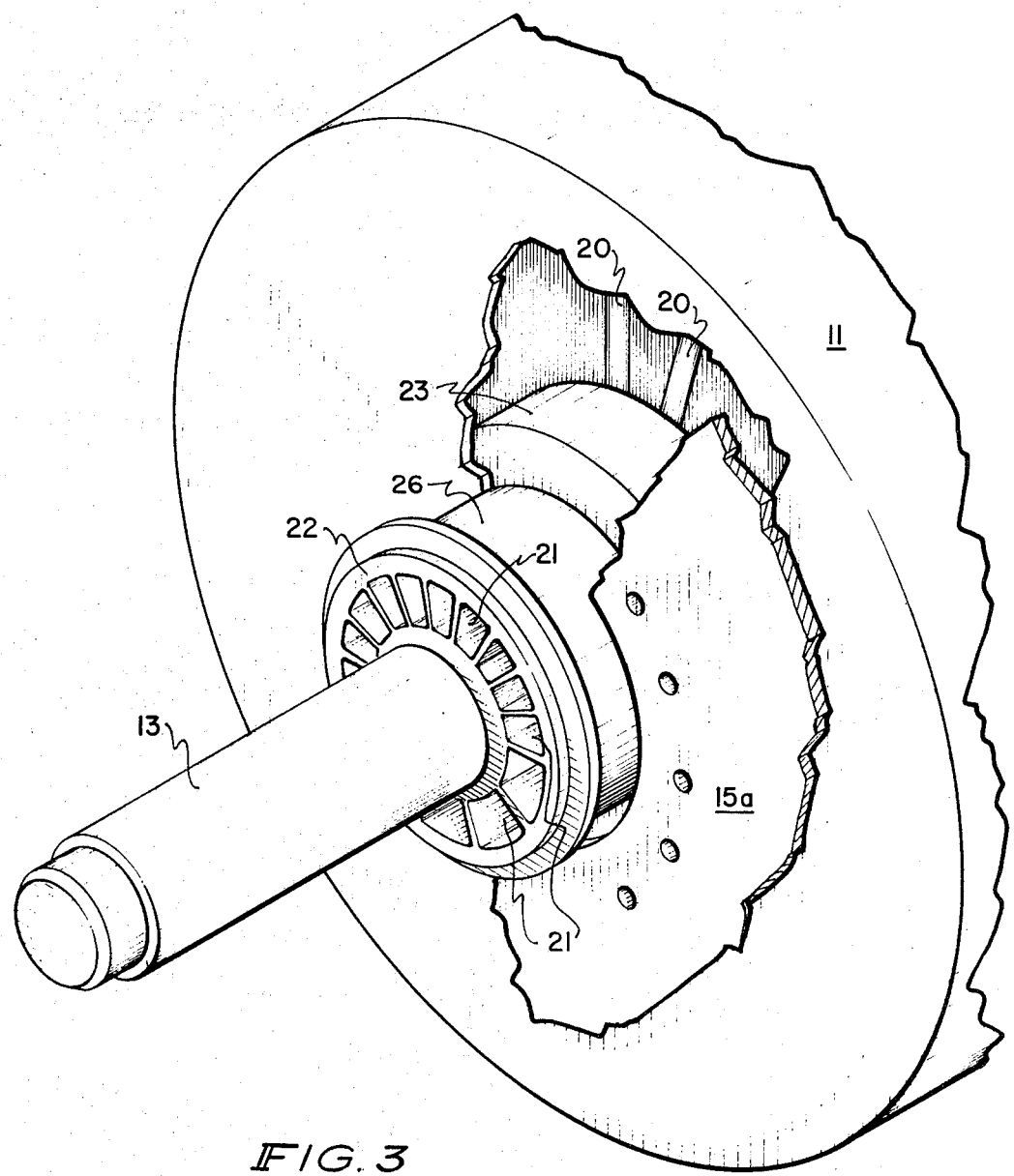
FIG. 3 is a perspective view, partially cut-away, of a portion of the drum adjacent the valve end of the filter illustrated in FIG. 1.

A plurality of axially-extending drainage compartments (not shown) may be spaced around the drum's surface beneath the filter medium. Each drainage compartment is served by at least one drainage pipe 20 (FIG. 3) providing communication from the compartment; these pipes extend to an intermediate compartment 23 wherein they connect to channels that terminate at one of the ports 21 in a wear plate 22 secured to the end of a short conduit, or hub, encircling the trunnion. The trunnion 13 is fixed to the drum 11 to support it for rotation and extends coaxially through the hub 26 to define an annular space therebetween.

Figure 2:
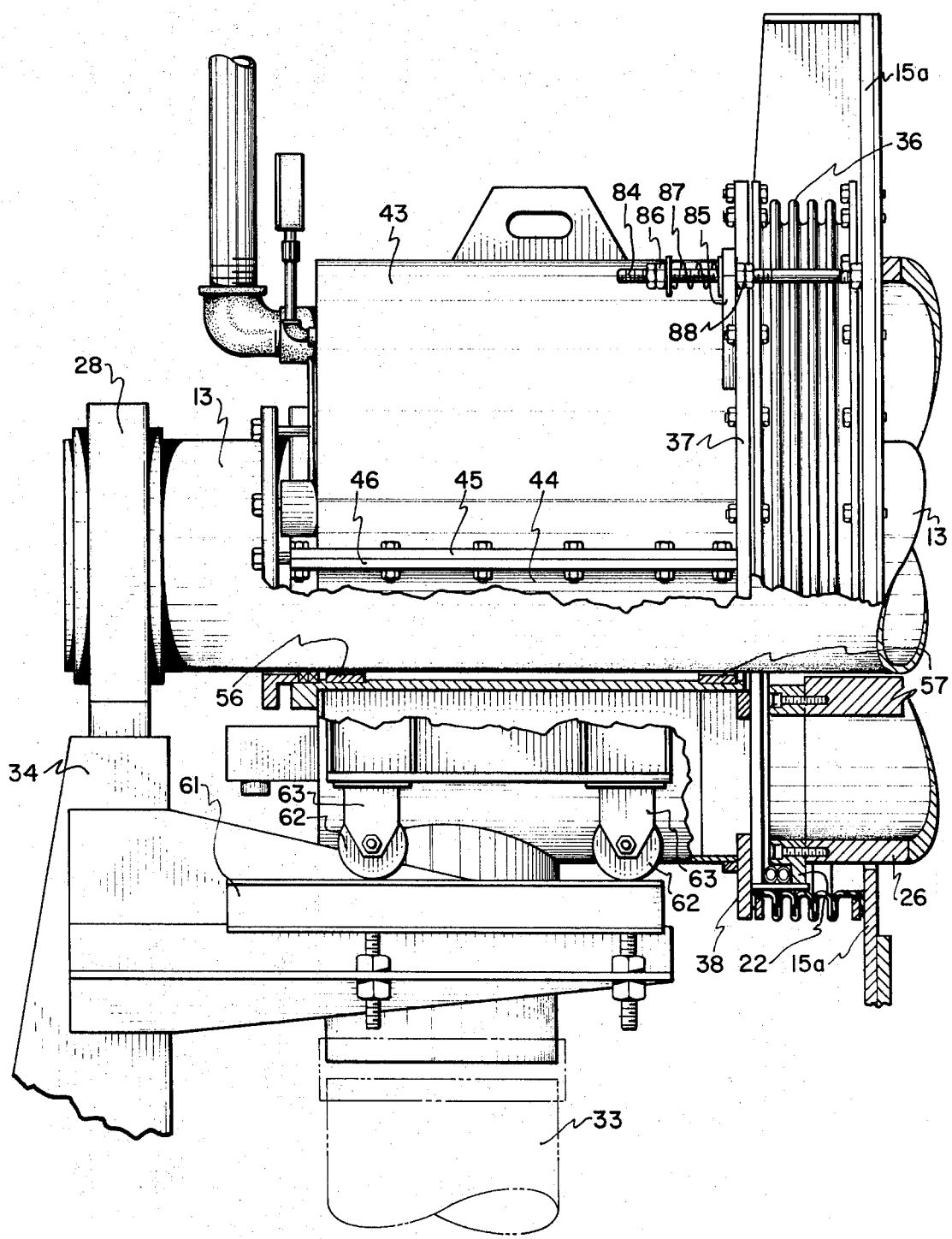
FIG. 2 is an enlarged side elevation, partially in section, of the valve, trunnion, and bearing of the filter illustrated in FIG. 1.

The arrangement of components of the filter of FIG. 1 at the valve is shown in more detail in FIGS. 2 and 4. Bearing 28, in which the trunnion is journalled, may be of any suitable form adapted to carry the weight of the rotating drum and to rest on a suitable support 34. The valve, spaced between the support bearing 28 and tank 15, encircles the trunnion 13 and is sealingly connected to tank 15 via an expansible flexible coupling 36 which encircles both the trunnion 13 and the conduit 26. The flexible coupling 36 may be an enlarged convoluted tube or bellows connected at one end to the tank's end 15a and, at the other end to the valve's semicircular flanges 37 and 38.

The valve is splitable; that is, it is formed of complemental parts comprising an upper housing 43 and a lower housing 44, which when fitted together along horizontal flanges 45 and 46, form a generally cylindrical structure. The valve's end toward bearing 28 is closed by semi-circular plates 47 and 48 fixed to the upper and lower housings 43 and 44, respectively, with the mated end plates defining between them a central aperture through which the trunnion 13 may project. Hemi-cylindrical casings 51 and 52 are supported centrally in the valve and are complemental to each other so that, when mated along outwardly-extending facing flanges 53 and 54, they form an axial sleeve through the valve; the sleeve closely encircles the trunnion 13 and thus separates it from the valve interior. The hemi-cylindrical casings 51 and 52 are supported at one end by the respective plates 47 or 48 and, at the other end, by support spokes 55 which extend radially from each casing to the corresponding housing's wall. The trunnion 13 is fitted through and may rotate within bushings 56 and 57 which are, in turn, fitted into grooves 58 and 59 adjacent the opposite ends of the casings.

Although the valve housing may have configurations other than cylindrical, it is important that the valve be formed of at least two portions that mate longitudinally and that when separated will enable disassembly and removal of the valve for maintenance or repair without disturbing the remainder of the filter. This presents a great advantage over prior values which typically were integral with trunnion bearings, hence not readily removable.

The valve surrounds the rotating trunnion 13, but neither supports nor is supported thereby. Rather, the valve is independently supported so that, regardless of wear between the valve and trunnion, the valve remains accurately aligned and its function is not impaired. In the illustrated embodiment, the valve's support comprises a pair of horizontal, parallel tracks 61 upon which ride wheels 62, which are mounted rotatably on brackets 63 depending from the lower housing 44. The valve may also be hung from overhead tracks. Since both the valve and the trunnion are independently supported, the bushings 56 and 57 need not have great load-carrying capacity since they serve primarily as guides and as part of the packing assembly.

When constructed as shown, the interior of the valve is an annular chamber concentrically about the trunnion. This annular chamber connects to the filtering drum via the aforementioned, rotatable conduit 26 of similar shape; the rotatable conduit's wear plate 22 is located in face-to-face relationship with a suitably ported wear plate, formed from complimental The valve's wear plate is stationary while the conduit's wear plate 22 rotates with the drum and the conduit 26. When assembled, the valve's wear plate parts 30 and 31 are usually bolted to the valve housing. As is usual in filters of this type, bridge blocks 64 and 65 are mounted in the valve's wear plates to regulate the flow of filtrate from the ports 21 of the rotating wear plate. The interior of the valve may be divided internally into two separate sectors, one much larger then the other; this is conveniently accomplished by two walls 66 and 67 extending axially from the bridge blocks 64 and 65, completely through the valve to terminate at the opposite end. Illustratively, the bridge plates 64 and 65 may be located inboard of the walls 67 to define a port 68 which communicates with the interior of the sector 71 between the walls 67. This sector is in turn vented to the atmosphere through conduit 72 inserted in aperture 73 in the valve body. For convenience, a drain tube 69 may also connect through an aperture 70 to provide a conduit for draining unwanted seepage from the sector 71. As the drum 11 rotates, the ports in the rotating wear plate 22 register successively with the different ports of the fixed wear plate. During registry with the larte sector in the valve, vacuum is communicated to the drum's surface; while at registry with the small sector, corresponding compartments at the drum's surface are vented to the atmosphere.

In other words, the lower and larger sector is the filtrate inlet port, and the upper and smaller sector is a vent port.

In accordance with the invention, sealing against filtrate leakage is readily accomplished by a system of simple packing rings and an arrangement whereby the packing rings are located in a reduced pressure atmosphere which tends to restrain leakage. For instance, filtrate that enters the casings 51 and 52 may seep along the trunnion 13 past the split bushings, the trunnion passes will be sealed from leakage to the outside by packing ring 78 and by the reduced pressure in the valve and casing. In the illustrated embodiment, the ring is compressed by a gland 74 which is bolted through spaced holes to plates 47 and 48. With this arrangement complex spring-loaded seals, packings and extensive stuffing box arrangements are unnecessary.

Figure 5:
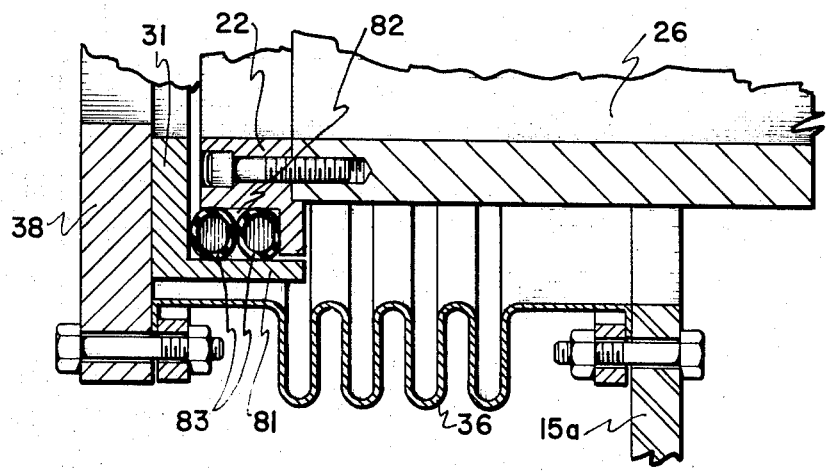
FIG. 5 is a partial sectional view illustrating further details of the valve structure.

Even though a positive clearance (i.e., a gap) is suggested between the rotatable ported plate 22 and the valve's fixed wear plates, and even though there is positive clearance about the conduit 26 as it extends through tank end 15a, no complex mechanical seals are provided at those locations. Instead, any leakage from the tank is received in the sealed surrounding chamber defined by the bellows 36 which closely encircles the conduit 26. If a space is left between the two plates, there will be a tendency to suck air and unfiltered material through the tank wall into the valve. This is noisy and also contributes to dirty filtrate. But such leakage is avoided by a seal arrangement between the facing wear plates. FIG. 5 illustrates one embodiment of such a seal arrangement wherein an annular area 82 is defined between the outer peripheral edge of rotary wear plate 22 and a fixed flange 81 that is axially directed to extend from the valve toward the tank adjacent the periphery of flanges 37 and 38. Tubular seals 83, in the nature of enlarged O-rings, nest in the annular interstitial area 82.

When assembled with the filter, the valve is movably mounted and flexibly coupled to the tank and the clearance between the valve and the end of the conduit 26 may be selectively adjusted by various means. One of such means for fixably and detachably connecting the valve to the tank end (FIG. 2) includes a plurality of spring-loaded studs 84 spaced around the valve through outstanding ears 85 radially depending from the valve housing. One end of each stud is fixed to the tank end 15a, and the other end fits through the ears and has a draw nut 86 threaded thereon. A pair of nuts 88 are also threaded for adjustment on the studs in position for the ears 85 to bear against to establish the minimum spacing between wear plates. A compressible spring 87, mounted around each stud 84 between the ears and the draw nuts, biases the valve toward the nuts 88 (i.e., forwards the rotary wear plate) to maintain the two facing wear plates pre-selectedly spaced apart.

In operation, drum 11 rotates in tank 15 and filtrate flows through the valve to discharge out barometric pipe 33. The flow induces a moderate vacuum in the valve, and this vacuum is communicated to the drum periphery via the filtrate drainage pipes to further induce liquid through the filter medium. The valve may operate for extended periods without leakage and without the need for alignment or maintenance. However, when maintenance is required, the valve is quickly and easily removed without disturbing the remaining filter apparatus.

We claim:

1. In combination with a trunnion supported rotary filtering apparatus arranged to rotate together with its trunnion within a stationary tank, filtrate conducting means which conducts filtrate from said rotary filtering apparatus to outlets outside said stationary tank, said outlets being fixed around said trunnion to rotate therewith, and a bearing located outside said tank and spaced therefor for journaling and supporting said trunnion to rotate therewith, a valve assembly in communication with said outlets and having outlet means for the discharge of filtrate from said valve, the improvement comprising a housing for said valve assembly, said housing comprising at least first and second detachable elements connected to each other and said tank and constructed and arranged around said trunnion which is rotatable therein; means supporting said housing independently of said trunnion and said tank for selective movement of said housing in a direction along said trunnion toward and away from said tank; expansible flexible coupling means sealingly connecting said housing to said tank to return assembly filtrate leakage to said tank.

2. The valve assembly according to claim 1 wherein said enabling supporting means comprises wheels and tracks.

3. The valve assembly according to claim 1 wherein said detachable elements are detachably joined together lengthwise of the trunnion whereby upon detachment of said parts said valve may be removed from about the trunnion.

4. The valve assembly according to claim 1 further including sealing means to seal said housing in fluid communication with said outlets which are fixed to said trunnion while permitting the latter to rotate.

5. The valve assembly according to claim 4 wherein said filtrate outlets comprise a hub extending axially through the filtering element in spaced, concentric relationship about the trunnion and terminating outside said tank, and a wear plate is fixed to the terminal end of said hub for rotation therewith, and outlet ports are in said wear plate and said filtrate conducting passages terminate in said outlet ports and said sealing means presses against said wear plate peripherally about said outlets.

6. The valve assembly according to claim 4 wherein said coupling means comprises an expansible tubular member extending between and sealingly connected to both the tank and said valve and surrounding said sealing means.

* * * * *